United States Patent [19]
Hattori et al.

[11] 3,921,281
[45] Nov. 25, 1975

[54] METHOD FOR JOINING STEEL BARS

[75] Inventors: Seiji Hattori, Nagoya; Tomio Kimura, Tokyo, both of Japan

[73] Assignee: Daido Seiko Kabushiki Kaisha, Japan

[22] Filed: Sept. 17, 1974

[21] Appl. No.: 506,692

Related U.S. Application Data

[63] Continuation-in-part of Ser. No. 298,268, Oct. 17, 1972, abandoned.

[30] Foreign Application Priority Data

| Dec. 19, 1973 | Japan | 48-142820 |
| Oct. 28, 1971 | Japan | 46-85723 |
| Apr. 21, 1972 | Japan | 47-40217 |
| Apr. 17, 1972 | Japan | 47-45223[U] |
| Aug. 14, 1972 | Japan | 47-95198[U] |

[52] U.S. Cl. ............ 29/520; 29/200 B; 29/237
[51] Int. Cl.² ............ B21D 39/00; B23P 11/00
[58] Field of Search ......... 29/517, 520, 237; 52/223

[56] References Cited
UNITED STATES PATENTS

| 3,019,520 | 2/1962 | Woolley | 29/520 X |
| 3,343,252 | 9/1967 | Reesor | 29/520 X |
| 3,551,999 | 1/1971 | Gutmann | 29/517 |
| 3,559,270 | 2/1971 | Beghi | 29/520 X |
| 3,579,794 | 5/1971 | Powell | 29/520 X |
| 3,777,354 | 12/1973 | Masters | 29/237 |

*Primary Examiner*—Charlie T. Moon
*Attorney, Agent, or Firm*—Stevens, Davis, Miller & Mosher

[57] ABSTRACT

A method for joining bars comprises the steps of placing the end portions of said two bars in a cylindrical sleeve,
 gripping one end of the sleeve with a chuck and moving a die to widen or narrow the distance between the die and chuck, whereby the sleeve is plastically worked along a part of its length,
 loosening said chuck and moving the chuck to narrow or widen the distance between the chuck and die,
 repeating alternately said gripping and loosening so that the sleeve is plastically worked across its full length and press-fitted onto the bars.

3 Claims, 49 Drawing Figures

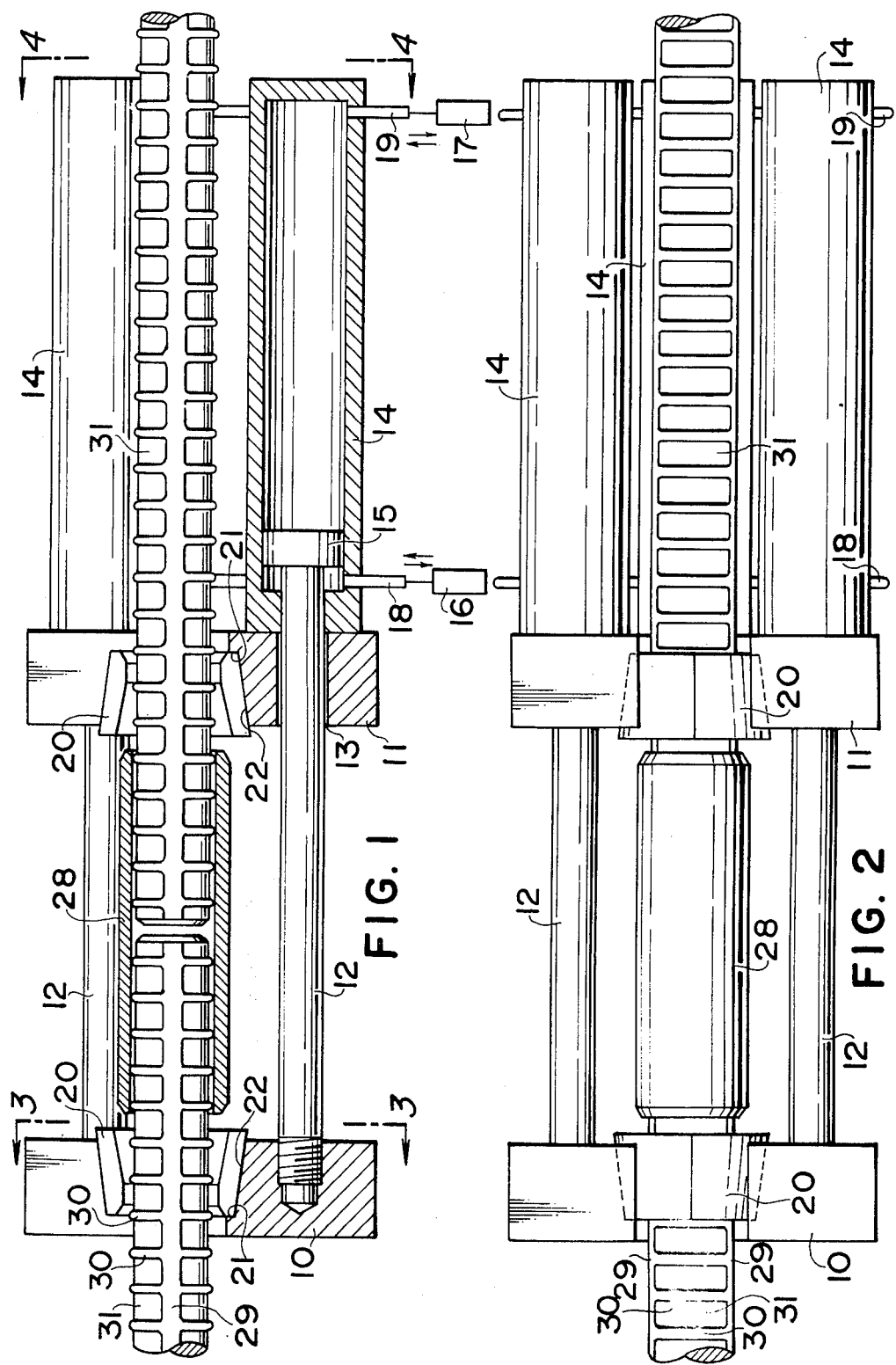

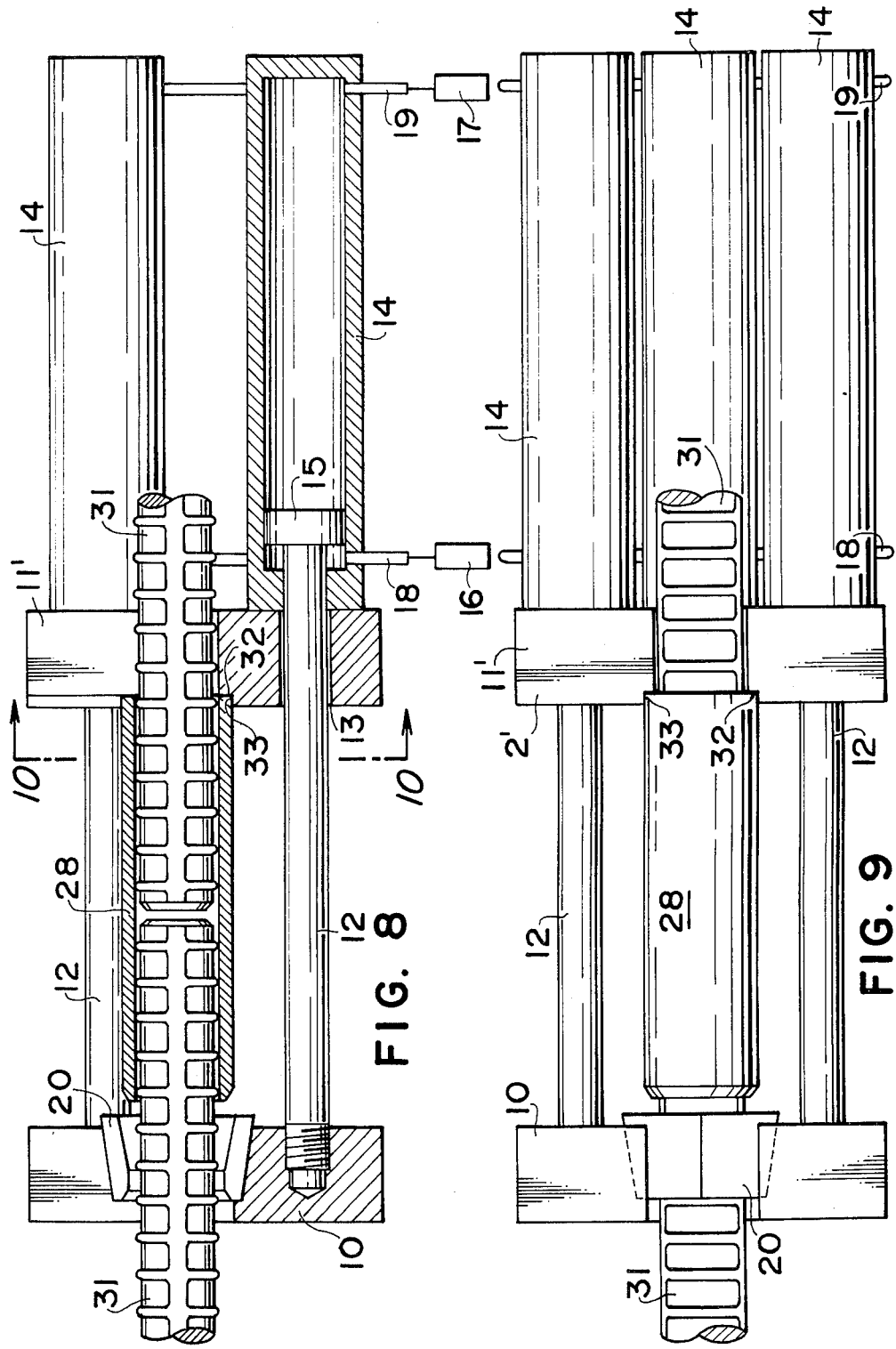

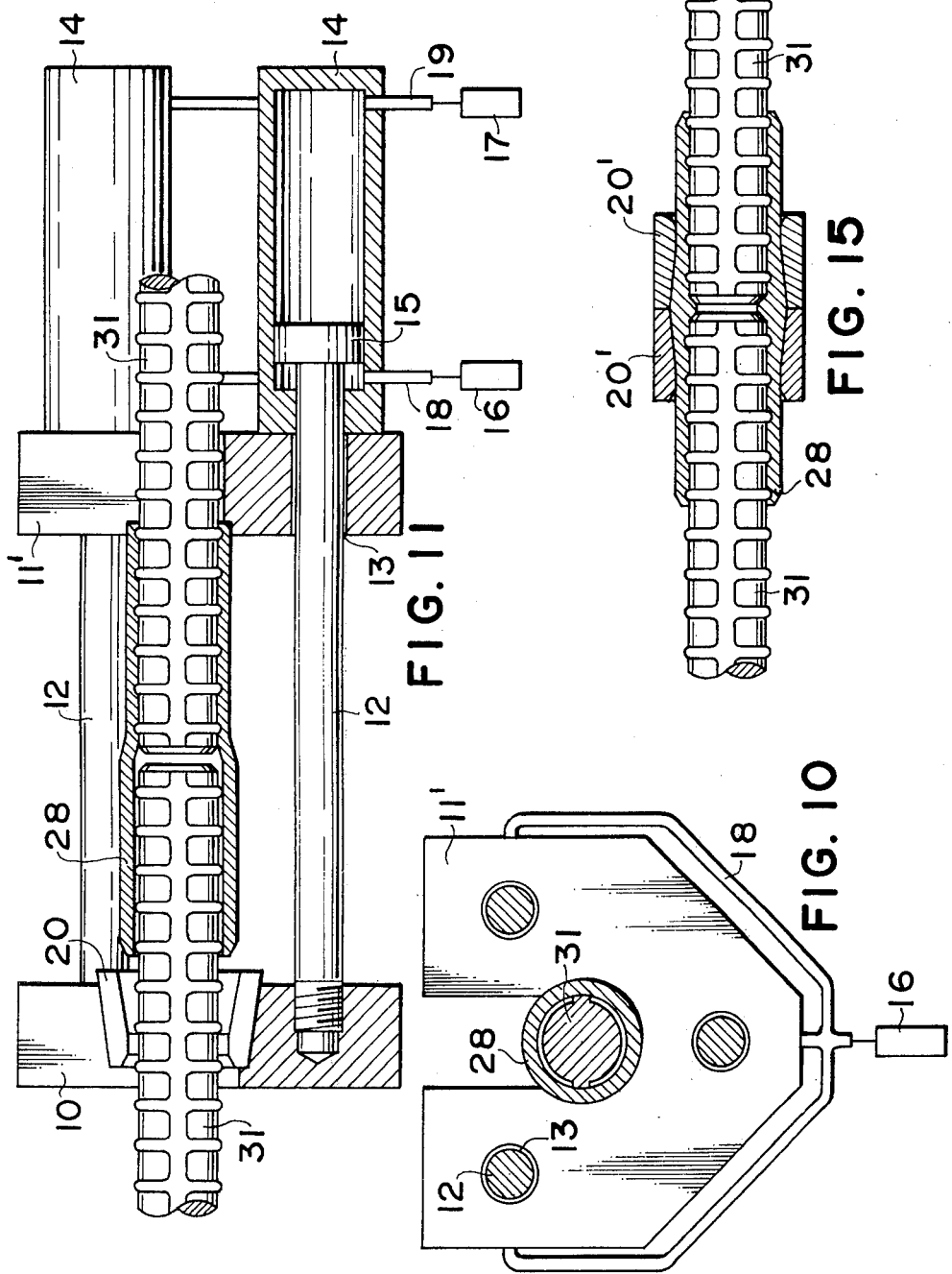

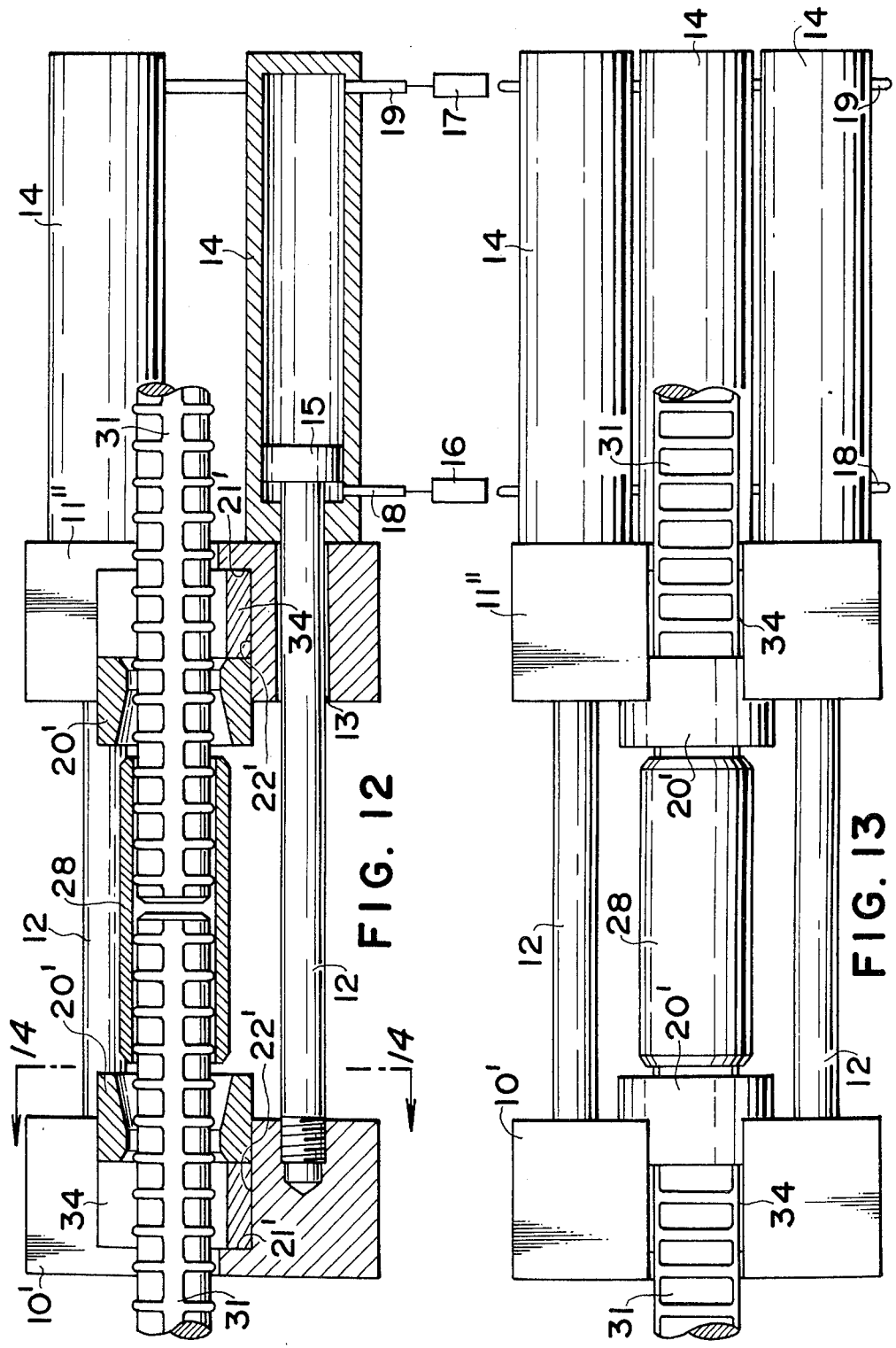

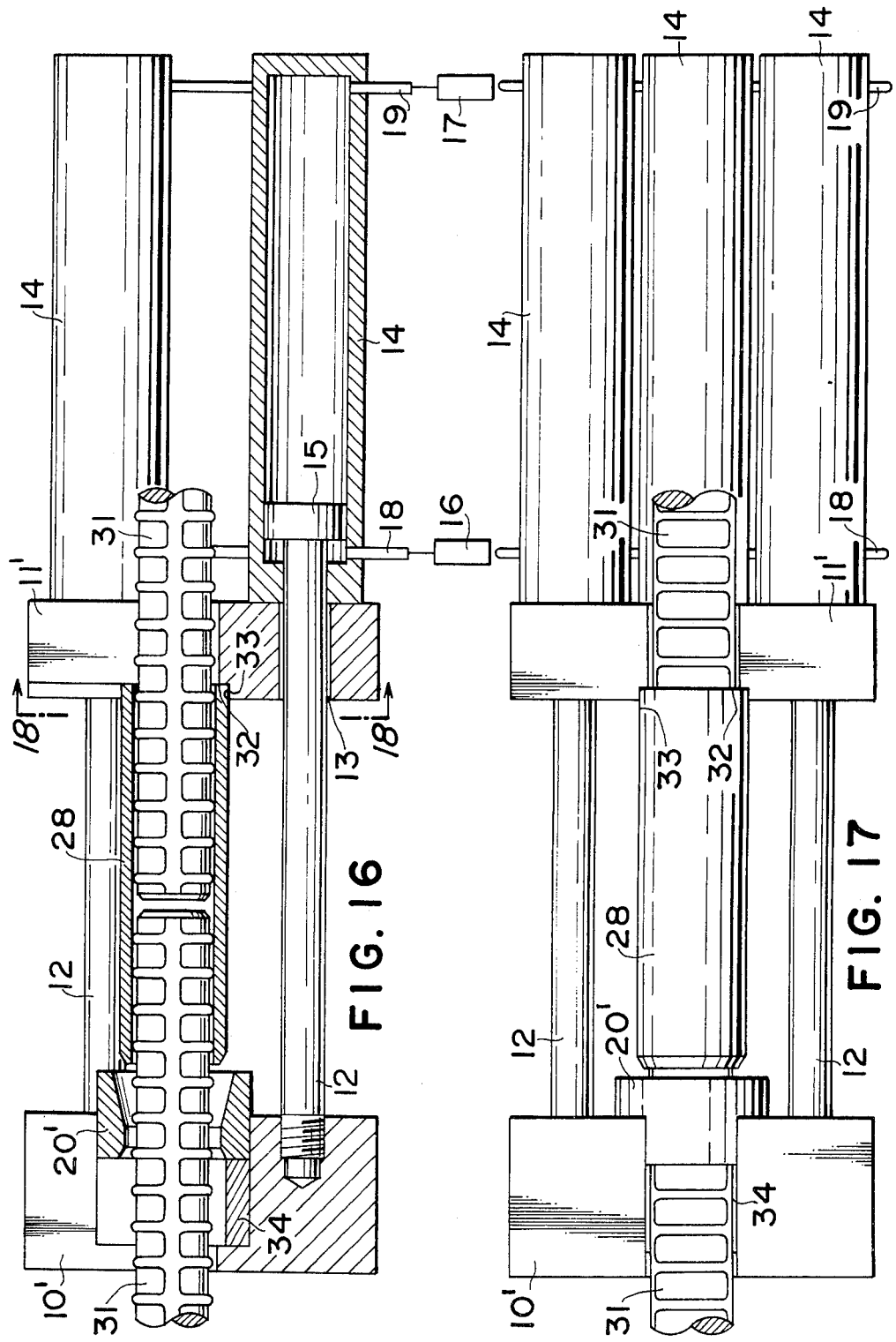

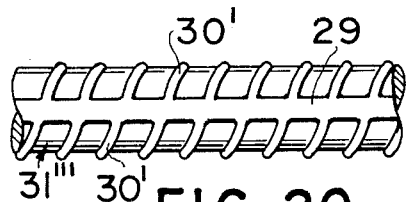
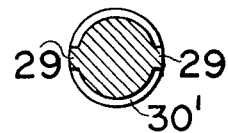
FIG. 20   FIG. 21
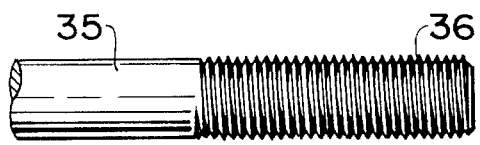
FIG. 22   FIG. 23
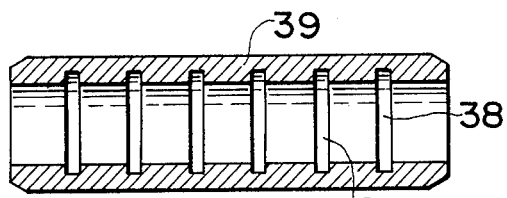
 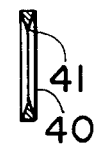
FIG. 24   FIG. 25   FIG. 26
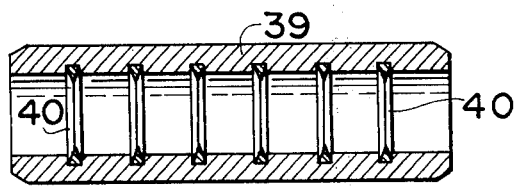
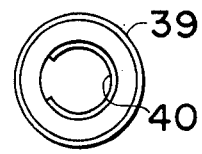
FIG. 27   FIG. 28
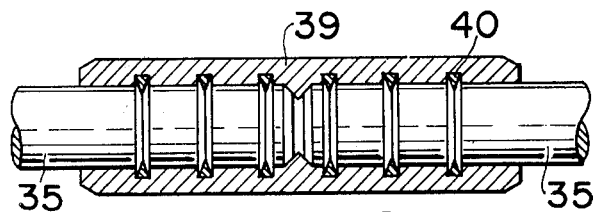
FIG. 29

METHOD FOR JOINING STEEL BARS

The present application is a continuation-in-part of the U.S. Pat. application Ser. No. 298,268 filed Oct. 17, 1972, now abandoned.

The present invention relates to a method for joining two steel bars, more particularly, deformed steel bars to be used in reinforced concrete structures.

A method for joining two deformed steel bars has been known which comprises inserting the ends of the two steel bars in a cylindrical sleeve and working plastically the sleeve with a die to fit it pressedly on the steel bars so as to effect joining them.

In case of practising the joining in a building site, it is desired to do the work with ease in a narrow-space or where the spacing between reinforcing bars, namely, the pitch of reinforcement is small, and to make less heavy the joining machine for deformed steel bars of big diameter which it has recently begun to adopt.

Accordingly, it is an object of the present invention to provide a joining method adapted to use a joining machine, which is light-weighted, disassemble and portable, even in narrow spaces or where the pitch of reinforcement for reinforced concrete is small.

It is another object of the invention to provide a joining method adapted to use a joining machine such that the means for actuating the joining machine such as a hydraulic cylinder is detachable from the body of the joining machine to divide the weight of it as a whole for ease of its handling and the operator may connect a small and light-weighted hydraulic cylinder sequentially to a plurality of joiner bodies set in position before hand.

It is another object of the invention to provide a joining method to carry out joining with even a long sleeve without causing any buckling, by working plastically the sleeve for every incremental portions along it length in sequence.

It is a further object of the invention to provide a joining method ensuring the joining work where the pitch of reinforcement is small, adapted to use a joining machine comprising a die device and a die holder which direct mainly in vertical directions the reaction force arising during the plastic working of the sleeve by the die device and prevent deformation of the holder frame mainly due to a bending moment on the holder frame, and a chuck device and a chuck holder to do the same function as mentioned above, the lateral width of the die holder being as small as possible.

The method for joining two deformed steel bars in accordance with the invention comprises the steps of placing the end portions of the two steel bars in a cylindrical sleeve, gripping one end portion of said sleeve with a chuck device and simultaneously moving a die device whose inner diameter is smaller than the outer diameter of said sleeve, along the outer surface of the sleeve in the direction of its axis toward the other end of the sleeve so as to widen or narrow the spacing between said die device and said chuck device whereby the sleeve is press worked plastically along a part of its length and pressedly fitted into said steel bars, loosening said chuck device and simultaneously moving said chuck device along the outer surface of the sleeve in the direction of its axis toward the other end of the sleeve so as to narrow or widen the spacing between said chuck device and said die device, and repeating alternately said gripping with the chuck device accompanied by said moving of the die device and said loosening of said chuck device accompanied by said moving thereof so that the sleeve is across its full length plastically worked to be pressedly fitted onto the two steel bars.

The method for joining two deformed steel bars in accordance with the invention also comprises the steps of placing the end portion of one of said steel bars in about a half length portion of a cylindrical sleeve, working plastically an end portion of said sleeve to reduce its diameter so that said end portion of the sleeve is press-fitted onto said steel bar, placing the end portion of the other of said steel bars in about the remaining half length portion of the sleeve, placing over said reduced diameter portion of the sleeve a chuck device having an inner diameter nearly equal to said reduced diameter and die device having an inner diameter nearly equal to said reduced diameter and smaller than the original outer diameter of the sleeve, gripping said sleeve with said chuck device and simultaneously moving said die device along the portion of said sleeve having the original diameter in the direction of its axis toward the other end of the sleeve so as to widen the spacing between the die device and the chuck device whereby the sleeve is plastically press-worked along a part of its length and fitted onto said steel bars, loosening the chuck device and simultaneously moving said chuck device along the reduced diameter portion of the sleeve in the direction of its axis toward the other end of the sleeve so as to narrow the spacing between the chuck device and the die device, and repeating alternately said gripping with the chuck device accompanied by said moving of the die device and said loosening and moving of the chuck device to plastically work the sleeve across its entire length to fit it pressedly onto said two steel bars.

The method of joining two deformed steel bars in accordance with the invention also comprises the steps of placing the end portions of the two steel bars in a cylindrical sleeve, placing, on the steel bar and in abutment with the rear end of the sleeve, a die device having an inner diameter smaller than the outer diameter of the sleeve; placing, at the back of the die device as viewed in the direction of movement thereof, a first chuck device having an inner diameter nearly equal to the reduced diameter of the sleeve to be obtained by the later plastical pressing work of said die device; and placing, on the rear end portion of the sleeve and ahead of said die device in the direction of its movement, a second chuck device having an inner diameter nearly equal to the original outer diameter of the sleeve, gripping the sleeve with said second chuck device and simultaneously moving said die device along the outer surface of said sleeve in the direction of its axis toward the other end of the sleeve so as to narrow the spacing between the die device and the second chuck device whereby the sleeve is plastically press-worked along a part of its length and fitted pressedly onto the steel bars, loosening the second chuck device and simultaneously moving the second chuck device and the first chuck device in the direction of the axis of the sleeve toward the other end of the sleeve so as to widen the spacing between the second chuck device and the die device and to narrow the spacing between the first chuck device and the die device, gripping said sleeve with the first chuck device and the chuck device and simultaneously moving said die device in a like manner to work plastically the sleeve along another part of its length and fit it pressedly onto the steel bar, loosening the first chuck device and the second chuck device and moving them in a like manner, and repeating alternately said gripping with the first and second chuck devices accompanied by said movement of the die device and said loosening of the first chuck device and the second chuck device and said movement thereof so that the sleeve is worked plastically across its full length to be press-fitted onto the two steel bars.

Other purposes and advantages of the present invention will become clear from the following description of its embodiments.

The present invention will now be described with reference to the embodiments shown in the accompanying drawings, in which:

FIG. 1 is a view showing the longitudinal cross section of an apparatus for joining steel bars practising the method of the invention;

FIG. 2 is a plan view of the apparatus shown in FIG. 1;

FIG. 8 is a cross section of another apparatus for joining steel bars practising the method of the invention;

FIG. 9 is a plan view of the apparatus shown in FIG. 8;

FIG. 10 is a transverse cross section of the apparatus shown in FIG. 9, taken through line 10—10 and seen in the direction of the arrow attached to the line;

FIG. 11 is a longitudinal cross section of a modification of the apparatus shown in FIGS. 8, 9 and 10;

FIG. 12 is a longitudinal cross section of still another apparatus for joining steel bars practising the method of the present invention;

FIG. 13 is a plan view of the apparatus shown in FIG. 12;

FIG. 15 is a longitudinal cross section of the steel bars joined by the joining apparatus shown in FIGS. 12, 13 and 14;

FIG. 16 is a longitudinal cross section of a further apparatus for joining steel bars practising the method of the invention;

FIG. 17 is a plan view of the apparatus shown in FIG. 16;

FIG. 20 is a side view of another example of the steel bars usable in the method of the invention;

FIG. 21 is a transverse cross section of the steel bar shown in FIG. 20;

FIG. 22 is a side view of another example of the steel bars usable in the method of the present invention;

FIG. 23 is a side view of still another example of the steel bars usable in the method of the invention;

FIG. 24 is a longitudinal cross section of another example of the sleeves usable in the method of the present invention;

FIG. 25 is a front view of a wire material usable in combination with the sleeve shown in FIG. 24;

FIG. 26 is a longitudinal cross section of the wire material shown in FIG. 25;

FIG. 27 is a longitudinal cross section of an assembly comprising the sleeve shown in FIG. 24 and the wire material shown in FIGS. 25 and 26;

FIG. 28 is a front view of the assembly of the sleeve and wire material shown in FIG. 27;

FIG. 29 is a longitudinal cross section of the steel bars joined by the assembly of the sleeve and the wire material shown in FIGS. 27 and 28;

Figure 35:
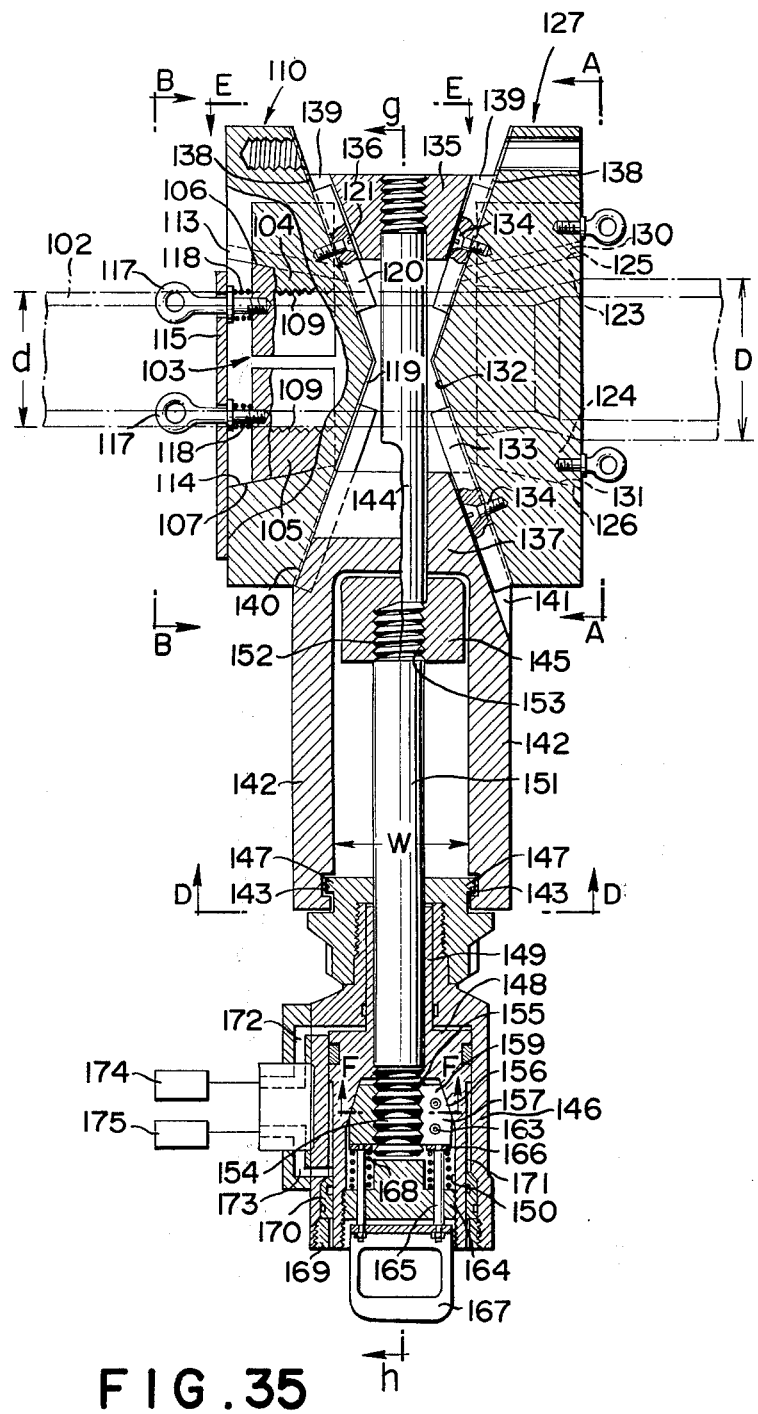
Figure 36:
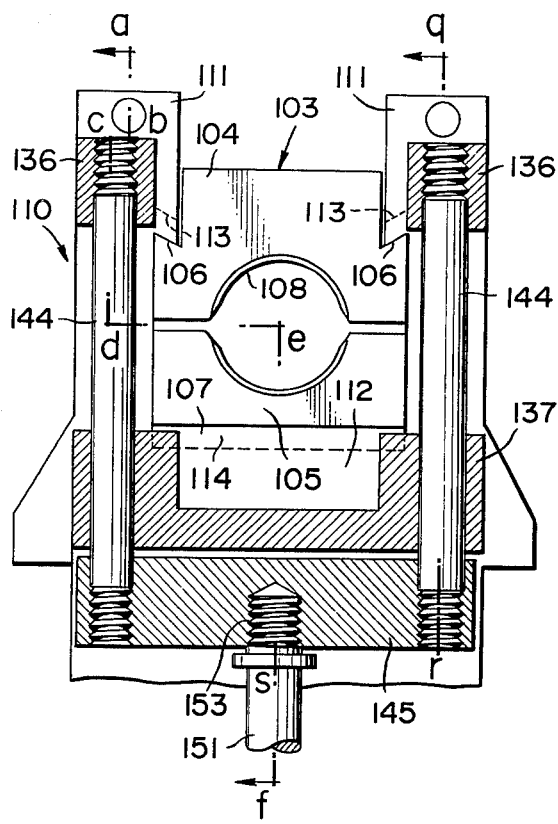
Figure 37:
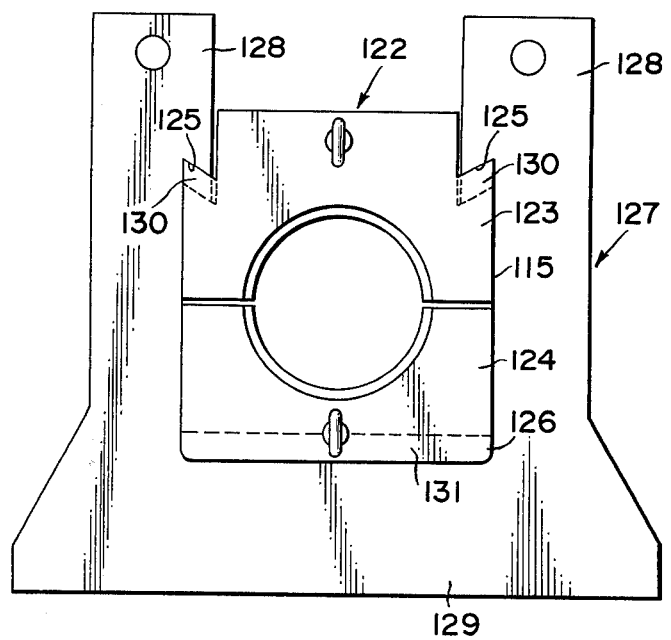
Figure 38:
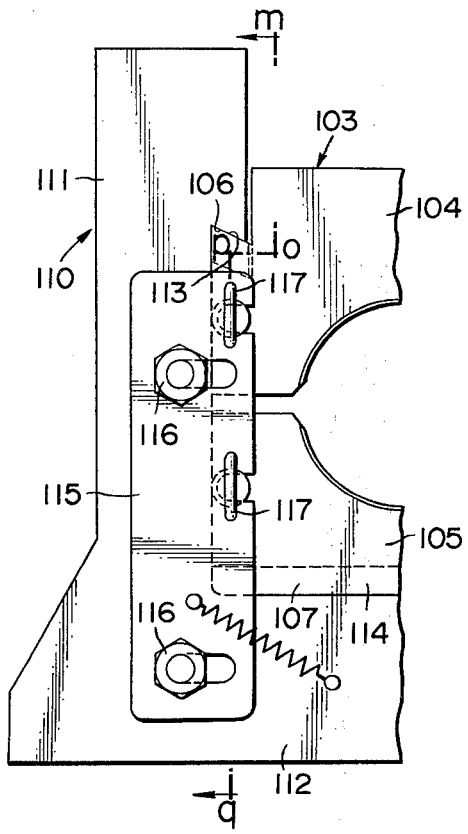
Figure 40:
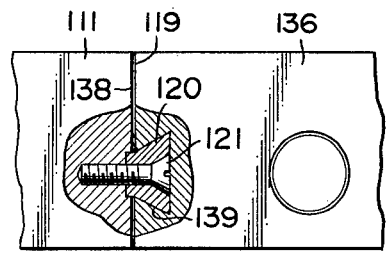
Figure 41:
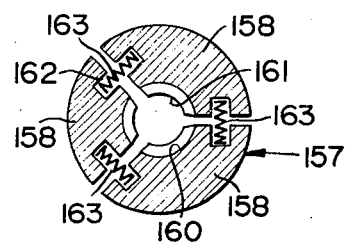
Figure 39:
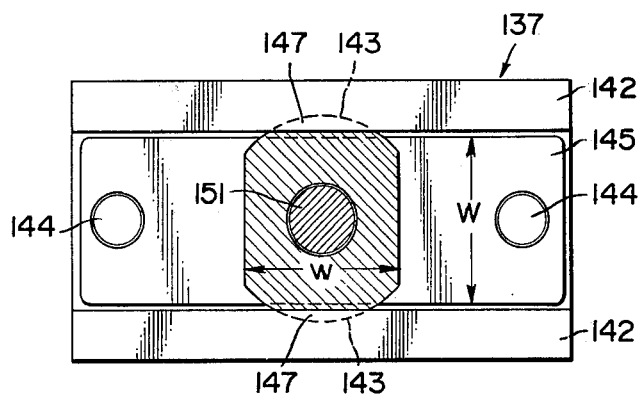
Figure 42:
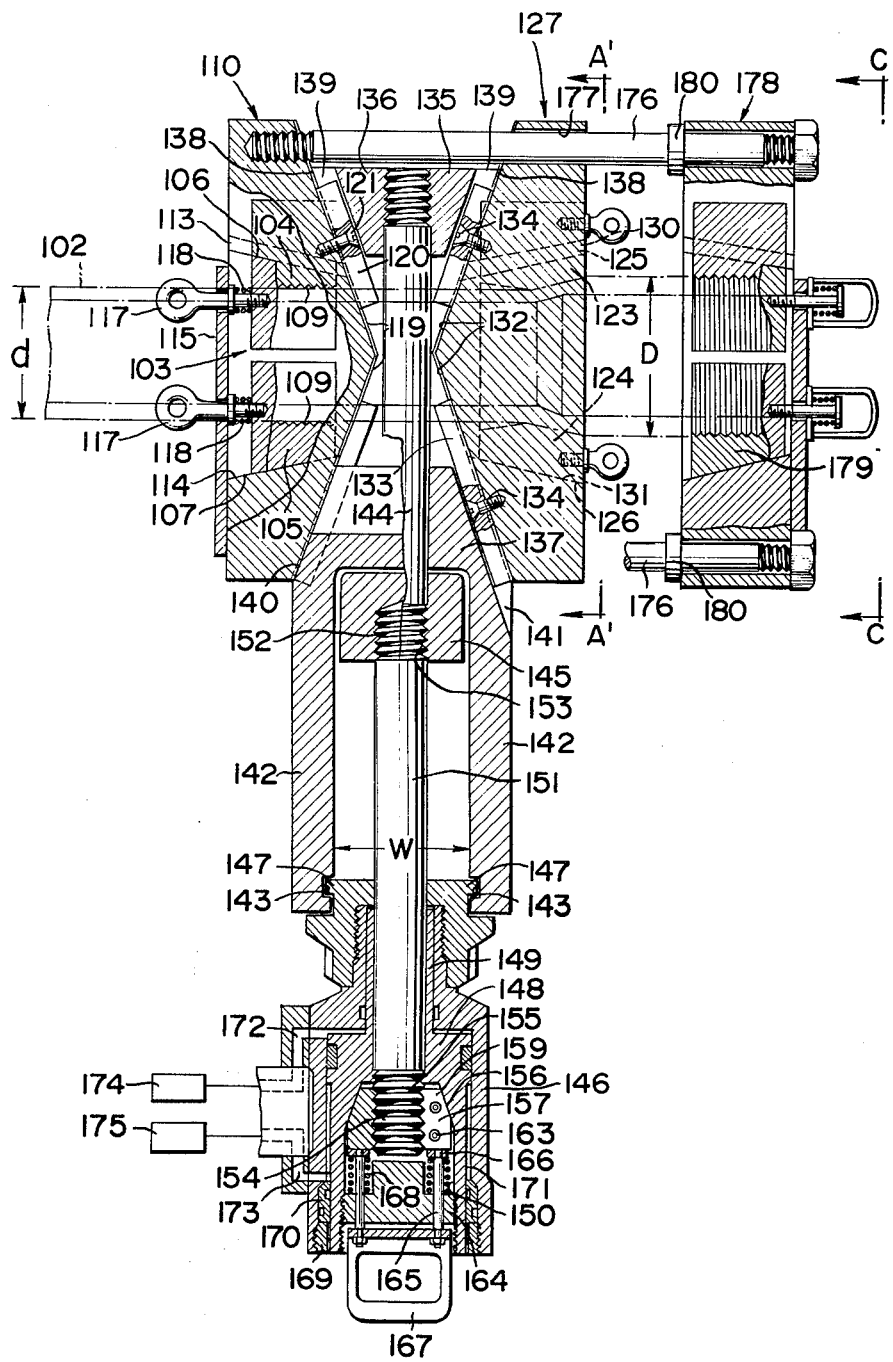
Figure 43:
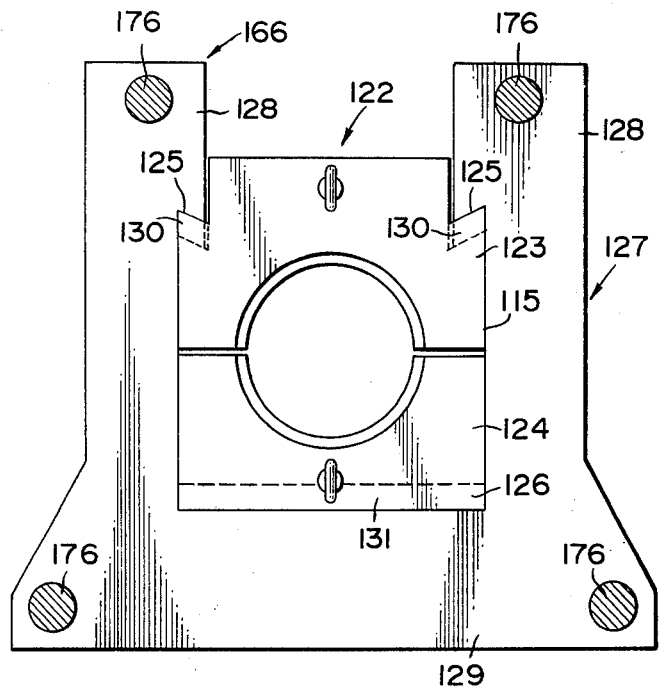
Figure 44:
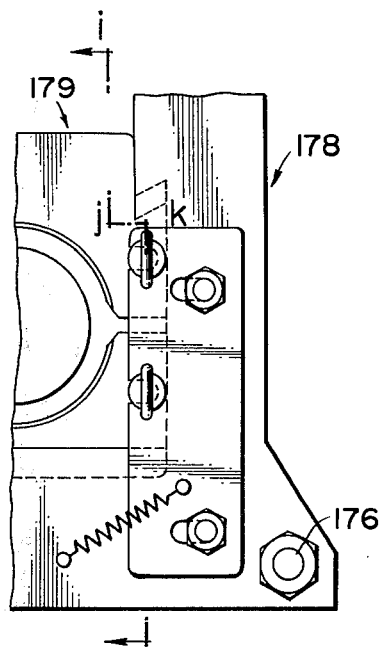
Figure 45:
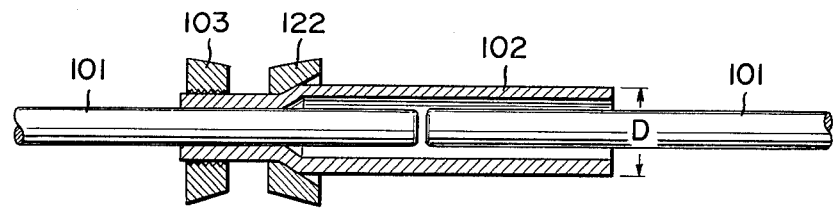
Figure 46:
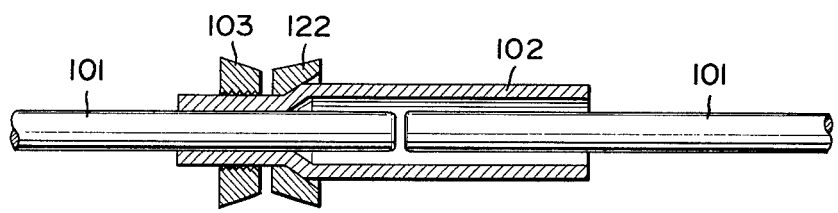
Figure 47:
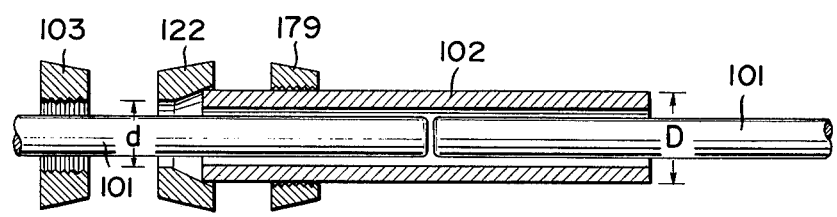
Figure 48:
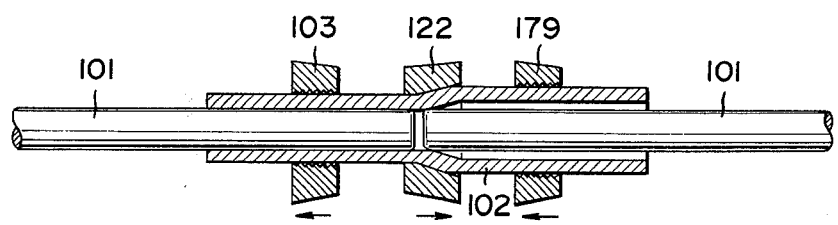
Figure 49:
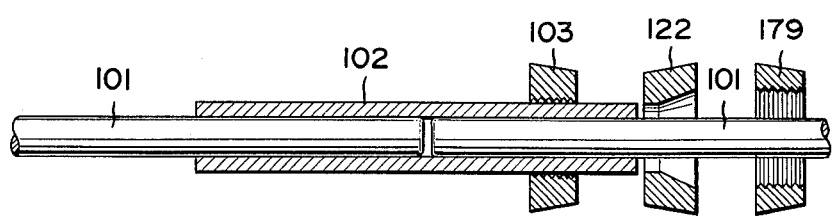

FIG. 35 is a side elevation, in longitudinal cross-section of a steel bar joining machine practising the invention, of which the left-hand side from the center line shows a cross-section taken along the line a—b—c—d—e—f in FIG. 36, a part of said left-hand side from the center line shows a cross-section taken along the line m—o—p—q in FIG. 38, and the right-hand side from the center line shows a cross-section taken along the line q—r—s—f in FIG. 36;

FIG. 36 is a front view of the same in longitudinal cross-section along the line g—h in FIG. 35, with a part of FIG. 35 out away;

FIG. 37 is a back view seen in the direction of the arrow of line A—A in FIG. 35;

FIG. 38 is a back view seen in the direction of the arrow of line B—B in FIG. 35;

FIG. 39 is a bottom view seen in the direction of the arrow of line D—D in FIG. 35;

FIG. 40 is a plan view seen in the direction of the arrow of line E—E in FIG. 35, partially in cross section;

FIG. 41 is a cross-section seen in the direction of the arrow of line F—F in FIG. 35;

FIG. 42 is a side elevation in longitudinal cross-section of another form, in which the chuck holder portion on the right shows a longitudinal cross-section of the line i—j—k—l in FIG. 44 and a longitudinal cross-section of the portions penetrated by the connecting rods;

FIG. 43 is a back view seen in the direction of the arrow of line A—A' in FIG. 42;

FIG. 44 is a back view seen in the direction of the arrow of line C—C in FIG. 42;

FIGS. 45 and 46 are schematic views showing the operation of the device of FIG. 35; and FIGS. 47, 48 and 49 are schematic views showing the operation of the device of FIG. 42.

Referring to the embodiment of the invention shown in FIGS. 1, 2, 3 and 4, there is positioned face to face a pair of nearly U-shaped plates 10 and 11 for support of the dies. Piston rods 12 of three hydraulic piston-cylinder devices are threadedly attached to the inner side of one plate 10 at both end parts and the middle part of its U shaped, respectively. Piston rods 12 extend through apertures 13 formed in the other plate 11. The cylinder 14 of each piston-cylinder devices is attached at its one end, as by welding, to the outer side of the plate 11, each piston rod 12 having at its other end a piston 15 in the cylinder 14. The opposite ends of each cylinder 14 are connected to sources of hydraulic liquid 16 and 17 by means of hoses 18 and 19, respectively.

Each of the plates 10 and 11 has in the inside of its U-shape a recess to fit and support a die 20. This recess comprises a support surface 21 of nearly U-shape perpendicular to the axis of the joining apparatus and a support surface 22 of nearly semiconical shape having the same axis asthe axis mentioned above.

Figure 3:
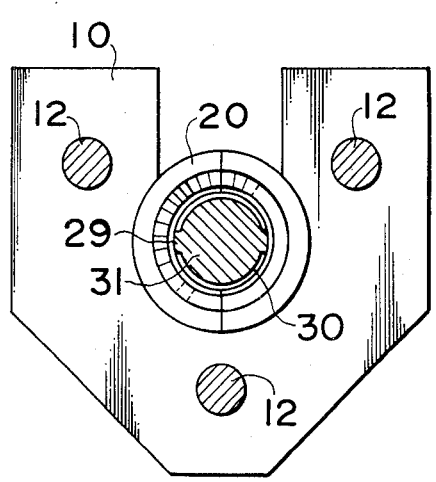
FIG. 3 is a transverse cross section of the apparatus shown in FIG. 1, taken through the line 3—3 and seen in the direction of the arrow attached to said line.
Figure 4:
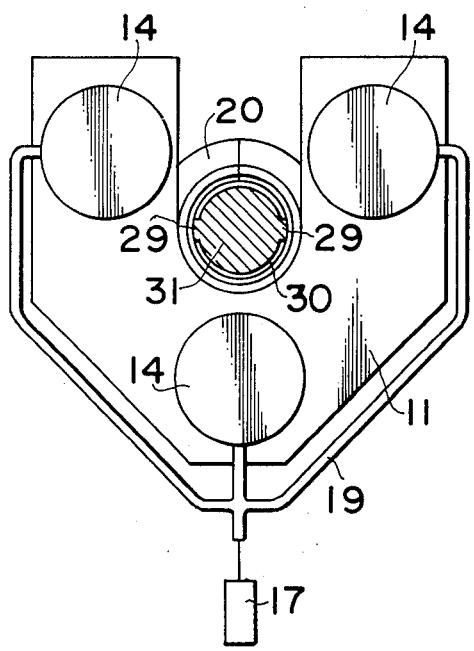
FIG. 4 is a view showing the end face of the apparatus shown in FIG. 1, seen from the line 4—4 in the direction of the arrow attached to said line.
Figure 5:
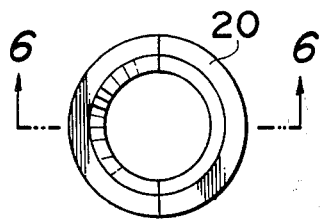
FIG. 5 is a front elevation of split dies to be used in the apparatus shown in FIG. 1.
Figure 6:
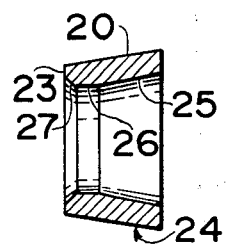
FIG. 6 is a cross section of the dies shown in FIG. 5, taken through line 6—6.

Each die 20 has, as shown in FIGS. 5 and 6, an end face 23 to fit the support surface 21 and an outer conical surface 24 to fit the support surface 22 and is of a split type that can be separated into two parts. Each die 20 has in its inside an approach portion 25, a bearing portion 26 and a relief portion 27. The inner diameter of the bearing portion 26 of each die is smaller than the outer diameter of the cylindrical sleeve 28 for joining steel bars. In case the steel bar to be joined has two longitudinal ribs 29 and many transverse ribs 30, the length of the bearing portion 26 is preferably smaller than the spacing between transverse ribs 30.

The respective ends of deformed steel bars 31 and 32, each having two longitudinal ribs 29 and many transverse ribs 30, are inserted in a sleeve 28 made of dead soft steel and placed in abutment with each other. The steel bars 31 and 32 are then arranged in the inside of the U shape of the plates 10 and 11. The split dies 20 are fitted over the steel bars in positions spaced outward from both ends of the sleeve 28. The dies 20 are fitted in the recesses 21 and 22 of the plates 10 and 11, respectively.

With each hydraulic piston-cylinder device being in position as shown, hydraulic pressure is supplied from the hydraulic liquid source 16 into each cylinder 14 on the left hand side of the piston 15, so the plates 10 and 11 are moved toward each other through the intermediary of the piston rod 12 and the approach portions 25 of the dies 20 and 20 engage the opposite ends of the sleeve 28. The outer surface of the sleeve 28 is then reduced by the bearing portions 26 of the dies. This is just like the drawing method. The surface of the sleeve may preferably be coated with zinc plating and spread with mutton oil thereover beforehand.

When the dies have gone one stroke, the entire sleeve 28 has been plastically deformed uniformly and fastened onto the steel bars 31 throughout entire length and circumference of the sleeve.

Thus the steel bars 31 and 31 are joined together with sleeve 28.

Figure 7:
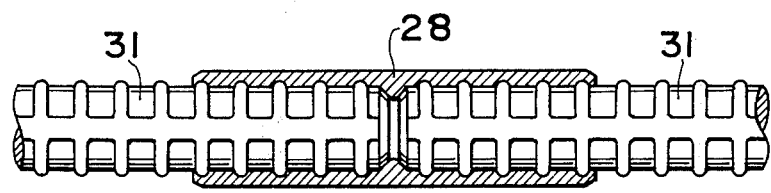
FIG. 7 is a view showing the longitudinal cross section of steel bars, joined together by a sleeve in accordance with the present invention.

Hydraulic pressure is then released from the left hand side of the piston 15 in the cylinder 14 of the hydraulic piston-cylinder device and, at the same time, the cylinder 14 is supplied on the right hand side of the piston 15 with hydraulic pressure from the source 17 of hydraulic liquid to move the plates 10 and 11 in the reverse direction. After that the split dies 20, 20 are divided and taken off the sleeve 28. Thus, the steel bars 31, 31 are joined together with the sleeve 28 as shown in FIG. 7.

A joining strength comparable with the strength of the steel bar per se can be obtained by proper choice of the thickness and length of the sleeve depending on the diameter of the deformed steel bar and the number of its transverse ribs.

Since during the process the sleeve is plastically cold worked, it undergoes work hardening and increases its tensile strength.

Even though the axes of the bars to be joined are not in alignment with each other in a building site, it is relatively easy to move the dies over the sleeve. Besides, since the process consists of a sort of reduction work in which the dies are moved in the axial direction of the sleeve, the power required for that is about one fifth as compared with the power required for conventional method wherein the press die is pressed against the sleeve in the direction perpendicular to the axis of the sleeve.

In FIGS. 8, 9 and 10, which show another embodiment of the invention, the arrangement is the same as in the embodiment shown in FIGS. 1, 2, 3 and 4, except for plate 11 to which the cylinder of the hydraulic piston-cylinder devices are attached.

In this embodiment, the plate 11' to which the hydraulic piston-cylinder devices are attached, is nearly of a U-shape and has in its inside a recess to fit and support one end of the sleeve 28. The recess comprises a support surface 32 of nearly U-shape perpendicular to the axis of the joining apparatus and a support surface 33 of nearly U-shape having the same axis as the axis mentioned above.

In this apparatus, the steel bars 31, 31 are inserted in the sleeve 28 end to end and then are arranged in the inside of the U-shape of plates 10 and 11'. A split die 20 is then fitted on one of the steel bars 31 and those end and side faces of the sleeve 28 which are far from the die 20 are engaged with the surfaces 32 and 33 of the plate 11'.

When the hydraulic piston-cylinder devices, which at that time are in the position shown, are actuated in the same way as described in the preceding embodiment, the die 20 is moved over the outer surface of the sleeve from one end to the other end of it, causing the metal of the sleeve to bite in the ribs 29 and 30 of the steel bars 31 and 31 so that the steel bars are joined together with the sleeve 28. Again in this embodiment, the slit die 20 is later taken off the sleeve 28.

FIG. 11 shows another embodiment of the invention, which is the same as the embodiment shown in FIGS. 8, 9 and 10 except that the stroke of the hydraulic piston-cylinder devices in the former is about ½ of that in the latter.

In this apparatus, a half of the sleeve is first deformed plastically and thereafter the steel bars 31, 31 together with the sleeve 28 are rearranged in the opposite direction and then the other half of the sleeve 28 is plastically deformed by the die 20. FIG. 11 shows the situation before the beginning of said later plastic deformation.

Figure 14:
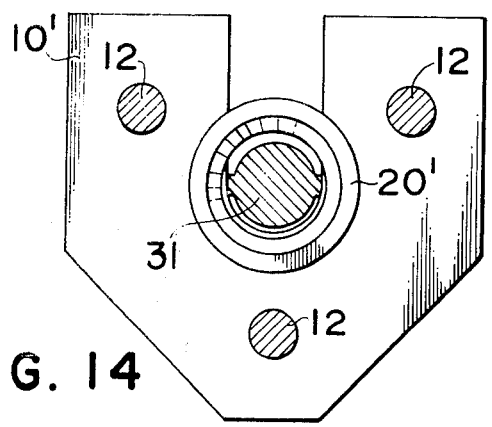
FIG. 14 is a transverse cross section of the apparatus shown in FIG. 12, as taken through line 14—14 and seen in the direction of the arrow attached to the line.

FIGS. 12, 13 and 14 show a further embodiment of the invention, which is the same as the embodiment shown in FIGS. 1, 2, 3 and 4 except for a pair of plates, dies and U-shaped members.

In this embodiment, each of the plates 10' and 11'' is nearly of U-shape inside which is provided a recess to fit and support each U-shaped member 34, 34 and a die 20', said recess comprising a support surface 21' of nearly U-shape perpendicular to the axis of the joining apparatus and a support surface 22' of nearly U-shape having the same axis as the axis mentioned above. Each die 20' is of a non-split type as it is not divided.

The steel bars 31 and 31 are inserted end to end in the sleeve 28, the dies 20' are fitted on the sleeve 28 at positions outward from both ends of the sleeve, and each die 20' together with a U-shaped member 34 is fitted in the recess 21', 22' of the plate 10', 11'.

When the hydraulic piston-cylinder devices, set in the position shown, are operated in the same manner as in the previous embodiments, each die 20' is moved over along the outer surface of the sleeve from one end to the center of it, whereby the metal of the sleeve 28 bites in the ribs of steel bars 31, and 31, thus joining the steel bars by the sleeve. Thereafter, the hydraulic piston-cylinder devices are operated in reverse direction. At that time the dies 20' and 20' are left on the sleeve 28. Accordingly, there is obtained the steel bars 31 and 31 joined together by the sleeve 28 as shown in FIG. 15. With this apparatus, joining operation is simpler because there is no need for the worker to remove the dies.

Figure 18:
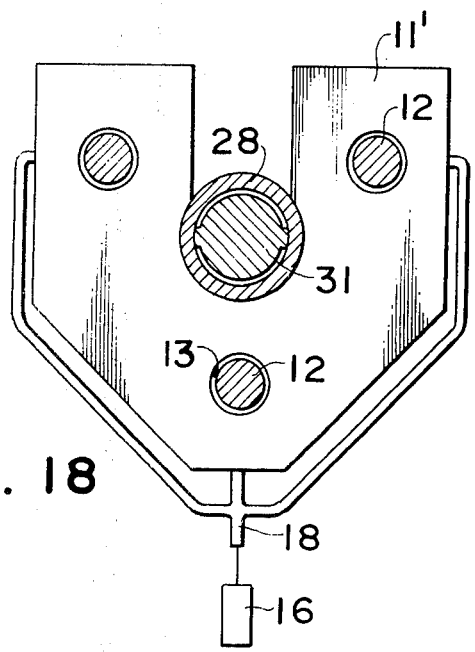
FIG. 18 is a transverse cross section of the apparatus shown in FIG. 16, taken through line 18—18 and seen in the direction of the arrow attached to the line.

FIGS. 16, 17 and 18 show still another embodiment of the invention, which is the same as the embodiment shown in FIGS. 12, 13 and 14 except for the plate carrying the cylinder of the hydraulic piston-cylinder devices.

In this embodiment the plate 11' to which the cylinder of the hydraulic piston-cylinder devices are attached is the same as the plate 11' in the embodiment shown FIGS. 8, 9 and 10 and has a recess comprising the same surfaces 32 and 33 as those in the said embodiment.

When the hydraulic piston-cylinder devices, set in the position shown are actuated in the same way as stated in the previous embodiments, the die 20' is moved over the outer surface of the sleeve from one end of it to the other, so that the metal of the sleeve 28 bites the ribs of the steel bars 31 and 31. Thus the bars are joined together by the sleeve and the die remains on the sleeve 28.

It is possible to join steel bars of different outer diameters by using the joining method and apparatus described with reference to FIGS. 1, 2, 3 and 4 or FIGS. 8, 9, 10 and 11.

Figure 19:
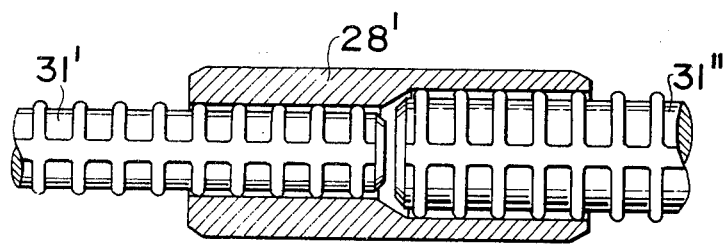
FIG. 19 is a longitudinal cross section of steel bars of different outer diameters and a sleeve for joining such bars.

To do so, a sleeve 28' having an inner diameter corresponding to the steel bar 31' of smaller diameter is prepared as shown in FIG. 19. The inside of the sleeve is then bored to half its length so that the bored portion will have an inner diameter corresponding to the steel bar to greater diameter. The steel bars 31' and 31'' of different diameters are inserted into such sleeve 28' and joined.

Deformed steel bars that can be used in the present invention include, besides those previously shown deformed bars 31''' with longitudinal ribs 29 and inclined ribs 30' as shown in FIGS. 20 and 21.

When the steel bars to be joined is a round steel bar 35, it may be threaded as 36 at its end beforehand as shown in FIG. 22, or it may have annular grooves cut as shown in FIG. 23, or knurled. Such thread cutting groove cutting or knurling may be made by rolling or pressing methods. Otherwise, a predetermined length of a round steel bar which has been threaded, cut in grooves or knurled beforehand in a factory may be welded to each round steel bar to be joined.

In order to join round steel bars 35, 35, a sleeve 39, instead of the sleeve 28, is used which has a plurality of circumferential grooves 38 in its inside, as shown in FIG. 24. Along with such a sleeve 39, there are used in the grooves 38 C-shaped ahrd wire parts 40 shown in FIGS. 25 and 26. Each C-shaped wire part has a sharp edge 41 projecting inward. The C-shaped wire parts 40 are put in the grooves 38 by pressing them to reduce their diameter and engaged therewith as they expand in the groove because of their elasticity. In this case, the size of the wire part 40 is so chosen that its inward edge 41 projects beyond the inner surface of the sleeve 39. The round steel bars 35 and 35 are then inserted in the sleeve and the latter is plastically worked by such methods as mentioned before, so that the sleeve 39 undergoes plastic deformation, causing the sharp edges 41 of the C-shaped wire parts 40 to bite in the round steel bars 35 whereby the round steel bars are joined tight to each other by the sleeve 39 through the intermediary of the wire parts 40.

Figure 30:
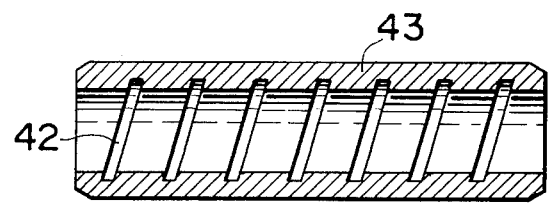
FIG. 30 is a longitudinal cross section of a still further example of the sleeve.

For sleeves, a sleeve 43 having helical grooves 42 in its inside as shown in FIG. 30 may be used.

Figure 31:
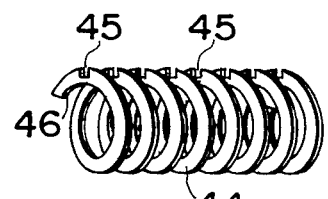
FIG. 31 is a perspective view of a wire material usable in combination with the sleeve shown in FIG. 30.
Figure 32:
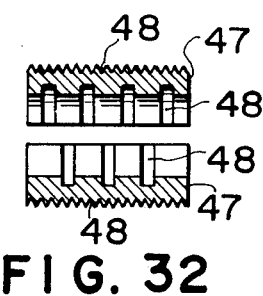
FIG. 32 is a longitudinal cross section of a pair of liners which may be interposed between the steel bars and the sleeve.
Figure 33:
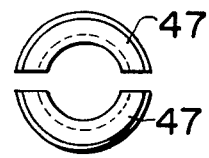
FIG. 33 is a front view of the pair of liners shown in FIG. 32.
Figure 34:
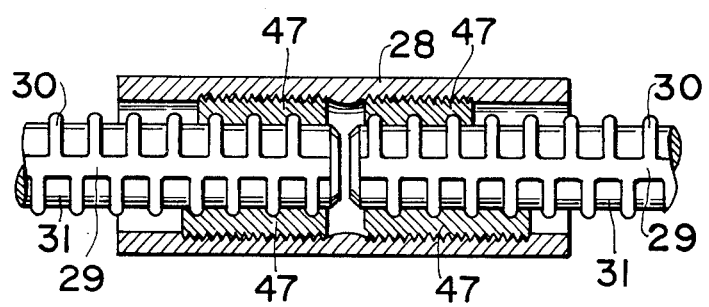
FIG. 34 is a longitudinal cross section of steel bars joined with the liners shown in FIGS. 32 and 33 interposed between the steel bars and the sleeve.

With such a sleeve, a helical wire part 44 shown in FIG. 31 is used in place of the aforementioned C-shaped wire part. This helical wire part 44 has notches 45 as well as a sharp inner edge 46 similar to that of C-shaped wire. The wire part 44, while it is twisted, is inserted in the sleeve from one end of the helical groove 42. Also in this case, the dimension of the wire part 44 is so determined that the inward edge 46 of the wire projects beyond the inner surfaceof the sleeve 43.

The round steel bars 35, 35 are then inserted in the sleeve 43 and the latter is plastically worked. The resulting plastic deformation of the sleeve 43 causes the notches 45 of the helical wire 44 to be closed and the sharp edge 46 to bite the round steels 35.

In the above mentioned method of joining, a pair of liners may be interposed between the deformed steel bars and the sleeve. Each liner 47 is of nearly semi-cylindrical shape and has in its inside a plualty of nearly semi-annular grooves 48 adaptable with the transverse ribs 30 of the deformed steel bar 31 and in its outer side screw-grooves 48.

When using them, a pair of liners 47 and 47 is placed on the end of each deformed steel bar 31, fitting the inner grooves 48 of the liner 47 to the transverse ribs 30 of the steel bar, and then the sleeve 28 is mounted thereover. By using a method and apparatus such as mentioned before, the metal of the sleeve 28 is made to bite in the grooves 48 of the liners 47 whereby the steel bars 31 are joined together by the sleeve 28 through the intermediary of liners 47. If desired, suitable adhesive may be applied to the inner surface of the liners 47 beforehand.

When joining is to be made of deformed steel bars 31" having inclined ribs 30' such as shown in FIG. 20, it is usually necessary to use a relatively long sleeve. By using the above mentioned liners, however, it is possible to apply a relatively short sleeve.

Another embodiment of the invention will be described with reference to FIGS. 35 – 40.

A first chuck device 103, which is capable of gripping the hollow cylindrical sleeve 102 for receiving and joining the end portions of the two deformed steel bars 101, 101, comprises an upper chuck member 104 and a lower chuck member 105. The upper chuck member 104 has tapered shoulder portions 106, 106 on both sides, whereas the lower chuck member 105 has a tapered edge 107 on the lower side. The upper chuck member 104 and the lower chuck member 105 have on their opposed sides nearly semi-circular curved faces 108, 108, respectively, with many cut-in groovess 109, 109.

The first chuck device 103 is fitted in a first chuck holder 110 comprising two arms 111, 111 and a base 112 connecting them, so the chuck holder appears to be nearly U-shaped. On the inside of each arm 111, 111 is a tapered shoulder portion 113, 113 corresponding to the tapered shoulder portion 106, 106 of the upper chuck member 104, while the base 112.has on its inner side a tapered edge 114 corresponding to the tapered edge 107 of said lower chuck member 105 and diverging outwardly.

The first chuck holder 110 has support plates 115, 115 secured to the sides in its front by means of bolts 116, 116. The upper chuck member 104 and the lower chuck member 105 are supported on the inner sides of the supports plates 115, 115 by bolts 117, 117 and compression springs 118, 118 and engage the first chuck at the tapered shoulder portions 106, 106, 113, 113 and tapered edges 107, 114.

The back of the first chuck holder 110 comprises oblique surfaces 119, 119 slating upward and downward respectively from the center line. Each oblique surface 119, 119 has a key 120, 120 fastened thereto with a screw 121, 121.

A die device 122 has an inner diameter d nearly equal to such diameter of the sleeve 102 as is obtained when it has been plastically press worked, and is of a split type comprising an upper die half 123 and a lower die half. The upper die half 123 has tapered shoulders 125, 125 on both sides, whereas the lower die half 124 has a tapered edge 126 at its bottom.

The die device 22 is fitted in a die holder 127 having two arms 128, 128 and a base portion 129 connecting them, so that the die holder 127 appears to be nearly U-shaped. On the inner sides of the arms 128, 128 are tapered shoulders 130, 130 corresponding to the tapered shoulders 125, 125 of the upper die half 123. On the inner side of the base 129 is a tapered edge 131 corresponding to the taperred edge 126 of the lower die half 124. The die device 122 engages the die holder 127 at the tapered shoulders 125, 125, 130, 130 and the tapered edges 126, 131, the taper being divergent toward outside the die holder 127.

The back of the die holder 127 is formed with oblique surfaces 132, 132 slanting upward and downward respectively from the center line. Each of the oblique surfaces has a key 133, 133 fixed hereto with a screw 134, 134. Between the first chuck holder 110 and the die holder 127 is provided a cam device 135 comprising upper cams 136, 136 and a lower cam 137. Each upper cam 136 has on both its sides slant surfaces 138, 138 in which are key ways 139, 139 to accept the key 120 of the first chuck holder 110 and the key 133 of the die holder 127, respectively.

The lower cam 137 has on its upper sides slant surfaces 140, 140, in which are formed kay ways 141, 141 to receive the key 120 of the first chuck holder 110 and the key 133 of the die holder 127. The lower part of the lower cam 137 branches into two parts, such branched parts 142, 142 have arcuate recesses 143, 143 in the inner sides of their lower portions.

To the upper cams 136 are attached the upper ends of connecting rods 144, 144, which extend through the lower cam 137 and are connected, at the lower ends, to a cross-head 145 existing between the branched parts 142, 142 of the lower cam 137.

To the lower most end of the branched parts 142, 142 is removably connected a hydraulic cylinder 146 by means of arcuate protrusions 147, 147 provided on both its upper side portions. The transverse with w between the protrusions 147, 147 is smaller than the spacing w between the branched parts 142, 142, it being possible to attach the hydraulic cylinder 146 to the lower cam 137 by passing between the branched parts 142, 142 the transverse width w between the protrusions 147, 147 and then turning the protrusions 147, 147 by 90° to bring them into engagement with the arcuate recesses 143, 143.

Within the hydraulic cylinder 146 is a piston 148 having a hollow piston rod 149. The lower part of the piston 148 is a cavity 150 with its lower end open. From this cavity extends a tension rod 151 through the hollow piston rod 149. The threaded upper portion 152 of the tension rod 151 is threaded in the threaded hole 153 in the cross-head 145. The lower end portion 154 has peripheral grooves 155, the upper inner surface 156 of the piston cavity 150 is tapered, and a chuck jaw device 157 is positioned between the inner side 156 of the cavity and the tension rod lower end 154.

The chuck jaw device 157 comprises three jaws 158, 158 split radially, the outer surface 159 of each jaw 158 being tapered corresponding to the inner tapered surface 156 of the piston, and the inner surface 160 of each jaw 158 being provided with an arcuate tooth 161 engageable with the peripheral groove 156 of the tension rod 151. Adjacent faces of jaws 158 have mutually opposing holes 162, 162 in which are inserted compression springs 163.

In the lower end of the piston cavity 150 is threaded a threaded lid 164, through which extend rod 165, 165 having on their tops ring plates 166 and having their lower ends fixed to a handle 167. A compression springs 168 are interposed between the ring plates 166 and the lid 164.

A threaded plug 169 and a packing 170 are fitted in the lower part of the cylinder, the small-diameter portion 171 of the piston 148 extends through the threaded plug 169 and the packing 170.

The cylinder 146 is provided with a port 172 for communication with the upper side of the piston 148, a port 173 for communicating with the reduced diameter portion 171 of the piston 148, the ports 172, 173 is connected to the hydraulic source 174, 175.

The tension rod 151 may be connected to the piston 148 through the intermidiary of the wedge means 157 urged by compression springs 168.

When the handle 167 is pullled, the compression spring 168 will be compressed to allow the jaws 158 of the chuck jaw device 157 to widen their spacings from each other by the action of the compression springs 163 thereby to cause the teeth 161 to chuck jaw device 157 to get out of engagement with the peripheral grooves 155 of the tension rod 151. As a result of that, rotation of the cylinder 146 by 90° while disengaging the tension rod 151 from the piston 148 will permit its separation from the flange portion of the arcuate protrusion 147.

A further embodiment of the invention will be described with reference to FIGS. 42 to 44.

The first chuck holder 110 has fastened to its four corner portions ends of connecting rods 176, 176 which extend through apertures 177 in the four corner portions of the die holder 127, with the other ends of the rods is fixed to the corner portions of the second chuck holder 178. The die holder and the second chuck holder 178 are positioned with a suitable space therebetween. In the drawing, the reference numeral 179 designates the second chuck device, whose inner diameter is nearly equal of the initial outer diameter of the sleeve. Each connecting rod 176 has a flange 180 positioned on the inner side of the second chuck holder 178. Parts used in this embodiment, except those mentioned above, are the same as the corresponding parts in the embodiment shown in FIGS. 35 – 40.

The operation of the embodiment shown in FIGS. 35 – 40 is as follows:

When hydraulic pressure is fed to the interior of the cylinder 146 above the piston 148 via passage 172, the tension rod 151 is drawn into the hydraulic cylinder 146 so that the upper cams 136, 136 secured to the tension rod 151 and the lower cam 137 secured to the hydraulic cylinder 146 will move toward each other whereby the spacing between the first chuck holder 110 and the die holder 127 will be widened by the slant surfaces 119, 119, 132, 132, the keys 120, 120, 133, 133 and the key ways 139, 139, 141, 141 of the first chuck holder 110 and the die holder 127.

Hydraulic pressure is then fed to the reduced diameter portion 171 of the piston via passage 173 while the hydraulic pressure above the piston 148 is expelled via passage 172, so that the tension rod 151 will be pushed out of the hydraulic cylinder 146 whereby the upper cams 136, 136 and the lower cam 137 will move away from each other to decrease the spacing between the first chuck holder 110 and the die holder 127.

In the embodiment shown in FIGS. 42 to 44, because the first chuck holder 110 is connected to the second chuck holder 178, an increase of the spacing between the first chuck holder 110 and the die holder 127 is followed by a decrease of the spacing between the second chuck holder 178 and the die holder 127, while a decrease in the spacing between the first chuck holder 110 and the die holder 127 is followed by an increase in the spacing between the die holder 127 and the second chuck holder 178.

Now, the method for joining steel bars will be described below.

Prior to using the embodiment shown in FIG. 35 to 40, one end of one steel bar 101 is placed in the sleeve 102 at about a half of its length and a portion of the end of the sleeve 102 is plastically press worked using such as the apparatus shown in FIG. 1 to press fit the end portion of the sleeve 102 onto the steel bar 101.

Then, one end of the other steel bar 101 is placed in the remaining half of the sleeve (See FIG. 45). The reduced diameter portion of said sleeve is then clasped by the first chuck device 103 and the die device 122. The hydraulic cylinder is then operated as was mentioned before to widen the space between the first chuck holder 110 and the die holder 127 so that the first chuck device 103 will grip the sleeve while the die device 122 will move over the sleeve in the axial direction (in the Figure, to the right) toward the opposite end of the sleeve to work the sleeve along a portion of its length and fit it pressedly onto the steel bar.

The hydraulic cylinder is then operated backward to narrow the space between the first chuck holder 110 and the die holder 127 to loosen the grip of the sleeve by the first chuck device 103. As the die device 122 grasps the sleeve fast, the first chuck holder 110 moves to the right as seen in the Figure and come toward the die holder 127 (see FIG. 46).

By repeating said operations alternately, the sleeve is plastically worked across its full length and fitted pressedly onto the deformed steel bars to join them together.

In cases where the embodiment shown in FIGS. 42 to 44 is used, the second chuck device 179 is first placed on the left-hand end portion of the sleeve, as shown in FIG. 47.

The hydraulic cylinder is then operated to widen the spacing between the first chuck holder 110 and the die holder 127 with correspondingly narrowed spacing between the die holder 127 and the second chuck holder 178, so that the second chuck device 176 will grasp the outer surface of sleeve while the die device 122 will move right-ward to plastically work the sleeve along a part of its full length.

The hydraulic cylinder is then operated reversely as shown in FIG. 48 to narrow the distance between the first chuck holder 110 and the die holder 127 and to widen the distance between the die holder and the second chuck holder 178, so that the second chuck device 179 is loosened and moves to the right.

By repeating said operations alternately, moving righward alternately the first chuck device 103 together with the second chuck device 179 and the die device 122, the whole length of the sleeve is worked plastically and thereby the deformed steel bars are joined together with said sleeve.

We claim:

1. A method for joining two deformed steel bars comprising the steps of
   placing the end portions of the two steel bars in a cylindrical sleeve,
   gripping one end portion of said sleeve with a chuck device and simultaneously moving a die device whose inner diameter is smaller than the outer diameter of said sleeve, along the outer surface of the sleeve in the direction of its axis toward the other end of the sleeve so as to widen or narrow the spacing between said die device and said chuck device whereby the sleeve is press-worked plastically along a part of its length and pressedly fitted on to said steel bars,
   loosening said chuck device and simultaneously moving said chuck device along the outer surface of the sleeve in the direction of its axis toward the other end of the sleeve so as to narrow or widen the spacing between said chuck device and said die device, and repeating alternately said gripping by the chuck device accompanied by said moving of the die device and said loosening of said chuck device accompanied by said moving thereof so that the sleeve is across its full length plastically worked to be pressedly fitted onto the two steel bars.

2. A method for joining two deformed steel bars comprising the steps of placing the end portion of one of said steel bars in about a half length portion of a cylindrical sleeve, working plastically an end portion of said sleeve to reduce its diameter so that said end portion of said sleeve is press-fitted onto said steel bar, placing the end portion of the other of said steel bars in about the remaining half length portion of said sleeve, placing over said reduced diameter portion of said sleeve a chuck device having an inner diameter nearly equal to said reduced diameter and a die device having an inner diameter nearly equal to said reduced diameter and smaller than the original outer diameter of said sleeve, gripping said sleeve with said chuck device and simultaneously moving said die device along the portion of said sleeve having the original diameter in the direction of its axis toward the other end of the sleeve so as to widen the spacing between the die device and the chuck device whereby the sleeve is plastically press worked along a part of its length and fitted onto said steel bars, loosening said chuck device and simultaneously moving said chuck device along the reduced diameter portion of the sleeve in the direction of its axis toward the other end of the sleeve so as to narrow the spacing between the chuck device and the die device, and repeating alternately said gripping with the chuck device accompanied by said moving of the die device and said loosening and moving of the chuck device to plastically work the sleeve across its full length to fit it onto said two steel bars.

3. A method for joining two deformed steel bars comprising the steps of placing the end portions of the two steel bars in a cylindrical sleeve, placing, on the steel bar and in abutment with the rear end of the sleeve, a die device having an inner diameter smaller than the outer diameter of the sleeve; placing, at the back of the die device as viewed in the direction of movement thereof, a first chuck device having an inner diameter nearly equal to the reduced diameter of the sleeve to be obtained by the later plastical press-working of said die device; and placing, on the rear end portion of the sleeve and ahead of said die device in the direction of its movement, a second chuck device having an inner diameter nearly equal to the original outer diameter of said sleeve, gripping the sleeve with said second chuck device and simultaneously moving said die device along the outer surface of said sleeve in the direction of its axis toward the other end of the sleeve so as to narrow the spacing between the die device and the second chuck device whereby the sleeve is plastically press worked along a part of its length and fitted pressedly onto the steel bars, loosening the second chuck device and simultaneously moving the second chuck device and the first chuck device in the direction of the axis of the sleeve toward the other end of the sleeve so as to widen the spacing between the second chuck device and the die device and to narrow the spacing between the first chuck device and the die device, gripping said sleeve with the first chuck device and the second chuck device, and simultaneously moving said die device in a like manner to work plastically the sleeve along another part of its length and fit it pressedly onto the steel bar, loosening the first chuck device and the second chuck device and moving them in a like manner, and repeating alternately said gripping with the first and second chuck device accompanied by the said movement of the die device, and said loosening of the first chuck device and the second chuck device and said movement thereof so that the sleeve is worked plastically across its full length to be press-fitted onto the two steel bars.

* * * * *